United States Patent
Ramakrishnan et al.

(10) Patent No.: US 8,650,238 B2
(45) Date of Patent: Feb. 11, 2014

(54) RESOLVING BUFFER UNDERFLOW/OVERFLOW IN A DIGITAL SYSTEM

(75) Inventors: Dinesh Ramakrishnan, San Diego, CA (US); Song Wang, San Diego, CA (US); Eddie L. T. Choy, Carlsbad, CA (US); Samir Kumar Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1399 days.

(21) Appl. No.: 11/946,253

(22) Filed: Nov. 28, 2007

(65) Prior Publication Data

US 2009/0135976 A1    May 28, 2009

(51) Int. Cl.
G06F 7/38    (2006.01)

(52) U.S. Cl.
USPC ............ 708/490; 708/498; 708/522; 375/371

(58) Field of Classification Search
None
See application file for complete search history.

(56) References Cited

U.S. PATENT DOCUMENTS

| | | |
|---|---|---|
| 4,882,754 A | 11/1989 | Weaver et al. |
| 5,131,013 A | 7/1992 | Choi |
| 5,416,516 A | 5/1995 | Kameyama et al. |
| 5,488,610 A | 1/1996 | Morley |
| 5,631,848 A * | 5/1997 | Laczko et al. ............... 708/203 |
| 5,677,969 A | 10/1997 | Auyeung et al. |
| 5,953,695 A | 9/1999 | Barazesh et al. |
| 6,330,286 B1 | 12/2001 | Lyons et al. |
| 6,744,472 B1 | 6/2004 | MacInnis et al. |
| 7,221,703 B2 | 5/2007 | Stacey et al. |
| 2002/0034273 A1 | 3/2002 | Spence et al. |
| 2002/0080886 A1 | 6/2002 | Ptasinski |
| 2002/0085489 A1* | 7/2002 | Sartain et al. ................ 370/229 |
| 2005/0157828 A1* | 7/2005 | Midya et al. ................. 375/372 |

* cited by examiner

*Primary Examiner* — Michael D Yaary
(74) *Attorney, Agent, or Firm* — Linda G. Gunderson

(57) ABSTRACT

In a digital system with more than one clock source, lack of synchronization between the clock sources may cause overflow or underflow in sample buffers, also called sample slipping. Sample slipping may lead to undesirable artifacts in the processed signal due to discontinuities introduced by the addition or removal of extra samples. To smooth out discontinuities caused by sample slipping, samples are filtered to when a buffer overflow condition occurs, and the samples are interpolated to produce additional samples when a buffer underflow condition occurs. The interpolated samples may also be filtered. The filtering and interpolation operations can be readily implemented without adding significant burden to the computational complexity of a real-time digital system.

35 Claims, 6 Drawing Sheets

RESOLVING BUFFER UNDERFLOW/OVERFLOW IN A DIGITAL SYSTEM

TECHNICAL FIELD

This disclosure generally relates to digital systems, and more specifically, to techniques for addressing sample slipping that occurs when digital data is transferred using mismatched clocks.

BACKGROUND

Many digital systems consist of multiple processing subsystems (e.g., modules) that are each controlled by a different clock source. These clock sources may be unsynchronized, meaning that they produce clock signals that are mismatched with one another in terms of phase and/or frequency.

Having unsynchronized clocks in a digital system can cause problems when data is transferred between subsystems. For example, in some digital systems, data samples are passed between subsystems in frames. A frame consists of a predefined number of samples, wherein each sample has one or more bits. In these types of systems, a receiving subsystem typically buffers (i.e., temporarily stores) a sequence of incoming samples from a transmitting subsystem until the receiving subsystem determines that a complete frame has been received. If the transmitting and receiving subsystems are controlled by unsynchronized clocks, eventually the frame timing may be off, and sooner or later the receiving subsystem may receive too many or too few samples per frame. Receiving too few samples per frame is referred to as buffer underflow, and receiving too many samples per frame is referred to as buffer overflow. The buffer overflow/underflow caused by clock mismatch is also referred to as "sample slipping".

A known solution to sample slipping involves discarding extra samples from a buffer when it overflows and stuffing repeated samples in the buffer when it underflows. An illustration of this approach is shown in FIG. 1. In this example, a frame includes n samples. With unsynchronized subsystems, when a transmitter's clock is faster than a receiver's clock, the buffer 10 overflows with too many samples. To remedy this, the extra samples in the overflowing buffer 10 are removed. In this case, there is one extra sample, so the n+1 sample, or last sample, is discarded. When the transmitter's clock is slower than the receiver's clock, the buffer underflows with too few samples. To fill the underflowing buffer 12, some of the received samples are simply repeated and added to the underflowing buffer 12. In this example, the missing nth sample is filled by repeating the n−1 sample as the nth sample.

The above-described solution to sample slipping, however, introduces discontinuity in the samples due to abrupt addition or deletion of samples. In certain digital systems, such as audio and/or visual processing systems, this discontinuity can introduce undesirable, perceptible artifacts into the output of the digital system. Thus, there is a need for an improved sample slipping solution that reduces undesirable artifacts, thereby improving the performance of digital systems having unsynchronized clocks.

SUMMARY

Disclosed herein is a new and improved approach to the problem of sample slipping. The approach significantly reduces the likelihood of perceptible artifacts caused by sample slipping in digitized content such as audio.

According to one aspect of the approach, a method of resolving buffer underflow/overflow addresses the sample slipping problem by filtering samples to smooth out discontinuities when a buffer overflow condition occurs, and interpolating samples to produce additional samples when a buffer underflow condition occurs. The filtering and interpolation operations can be readily implemented without adding significant burden to the computational complexity of a real-time digital system.

According to another aspect of the approach, an apparatus includes a plurality of unsynchronized clock sources, a first subsystem, a second subsystem, a buffer between the subsystems, and a processor. The first subsystem processes digital samples according to a first clock signal from the clock sources, and the second subsystem processes digital samples according to a second clock signal from the clock sources. The buffer receives digital samples from the first subsystem based on the first clock signal. The processor is configured to determine whether a buffer underflow or buffer overflow condition exists, based on the number of samples received into the buffer during a frame. The length of the frame is determined according to the second clock signal. If a buffer underflow exists, the processor interpolates the samples to compute one or more additional samples and then stuffs the additional samples into the buffer. If a buffer overflow exists, the processor filters the samples and then discards extra samples from the buffer.

According to further aspect of the approach, a digital device includes a buffer for storing a plurality of samples and circuitry for resolving buffer underflow/overflow associated with sample slipping. A first circuit determines whether a buffer underflow or buffer overflow condition exists based on the number of samples received into the buffer. If a buffer underflow exists, a second circuit interpolates the samples to compute one or more additional samples, and then stuffs the additional samples into the buffer. If a buffer overflow exists, a third circuit filters the samples and then discards one or more extra samples from the buffer.

According to an additional aspect of the approach, a computer-readable medium comprises a software program having a first code segment for buffering a plurality of digital samples corresponding to a predetermined frame, a second code segment for determining whether a buffer underflow or buffer overflow exists based on the number of digital samples received, a third code segment for interpolating the digital samples to compute one or more additional digital samples, if a buffer underflow exists, a fourth code segment for filtering the digital samples, if a buffer overflow exists, and a fifth code segment for discarding one or more extra digital samples from the digital samples, if a buffer overflow exists.

Other aspects, features, embodiments and advantages of the sample slipping technique will be or will become apparent to one with skill in the art upon examination of the following figures and detailed description. It is intended that all such additional features, embodiments, processes and advantages be included within this description and be protected by the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the sample slipping approach. In the figures, like reference numerals designate corresponding parts throughout the different views.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

Figure 1:
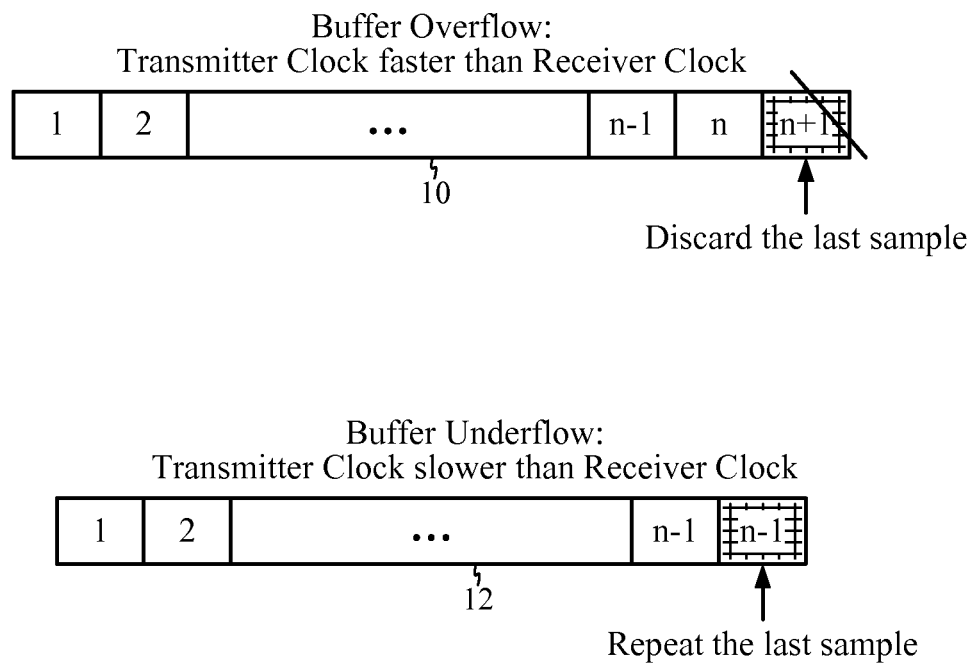
FIG. 1 conceptually illustrates a prior art solution to sample slipping.
Figure 2:
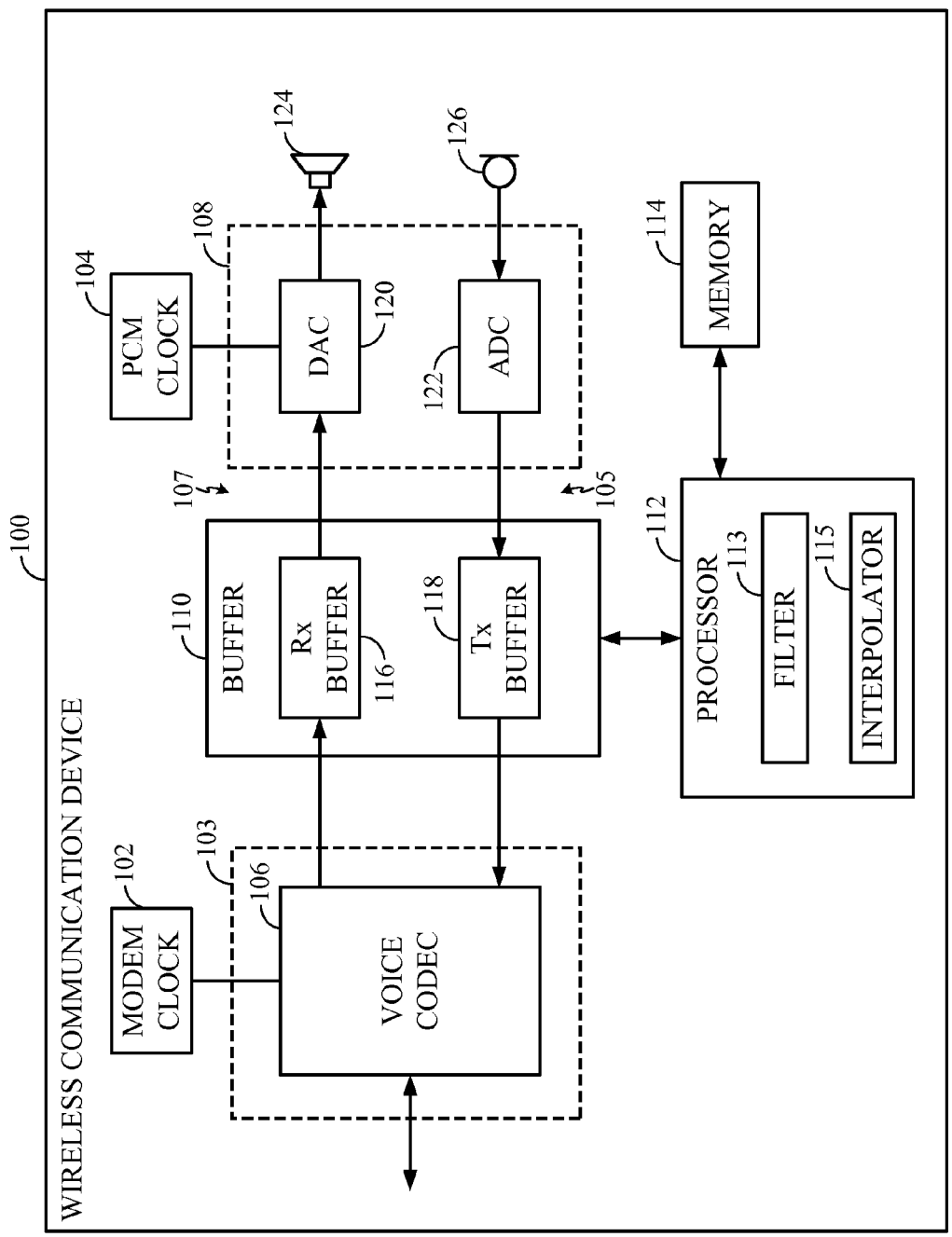
FIG. 2 illustrates a block diagram of a wireless communication device employing at least one of the improved sample slipping solutions disclosed herein.

Turning now to the drawings, and in particular to FIG. 2, there is illustrated a block diagram of a digital system, such as a wireless communication device (WCD) 100, that includes an improved sample slipping solution. The WCD 100 may take the form of a mobile telephone, a satellite telephone, a wireless communication card incorporated within a portable computer, a personal digital assistant (PDA) equipped with wireless communication capabilities, or any of a variety of devices capable of wireless communication. The techniques of this disclosure are described in the context of wireless communication devices for exemplary purposes only. The techniques may also be used in other devices, including wired communication devices, packet-based communication devices, and devices such as audio and/or visual playback devices, recording devices, displays and other digital processing devices that are not principally directed to communication.

The WCD 100 communicates with a plurality of base stations (not shown), preferably using a CDMA (code division multiple access) scheme or a W-CDMA (wideband CDMA) scheme. The base stations are generally stationary equipments that wirelessly communicate with the WCD 100 in order to provide network access to the WCD 100. For example, the base stations may provide an interface between the WCD 100 and a public switched telephone network (PSTN) such that telephone calls can be routed to and from the WCD 100. Alternatively, or additionally, the base stations may be coupled to a packet-based network for transmission of packet-based voice information or packet-based data.

In the example of FIG. 2, the WCD 100 includes a plurality of unsynchronized clock sources 102, 104, a modem-clocked subsystem 103, a PCM-clocked subsystem 108, a buffer 110 between the subsystems 103, 108, a processor 112, a memory 114, a speaker 124 and a microphone 126. In general, input audio data is received by the microphone 126 and processed through the WCD 100 along a transmit (Tx) path 105, and output audio data is processed through the WCD 100 along a receive (Rx) path 107 and output at the speaker 124.

The modem-clocked subsystem 103 includes a voice codec (vocoder) 106 that processes audio samples according to a modem clock signal from a first clock source (modem clock) 102. The vocoder 106 compresses digitized audio data input to the WCD 100 on the Tx path 105 and decompresses digitized audio data output from the WCD 100 on the Rx path 107. The vocoder 106 can employ one or more compression/decompression algorithms, and can receive and output audio data according to predefined audio or voice data formats.

The PCM-clocked subsystem 108 includes a digital-to-analog converter (DAC) 108 and an analog-to-digital converter (ADC) 122, each processing digital audio samples and an incoming analog audio signal, respectively, according to a PCM (pulse code modulation) clock signal from a second clock source (PCM clock) 104. In the example of FIG. 2, the DAC 108 and ADC 122 process audio samples at a rate of about 8 KHz.

Audio hardware modules in the front-end of the WCD 100 (i.e., PCM-clocked subsystem 108) are controlled by the PCM clock 104 used by the ADC 122 and DAC 102; whereas the vocoder 106 and other components in the modem-clocked subsystem 103 are controlled by a clock source that is unsynchronized with the PCM clock 104, preferably the modem clock 102.

In the example of FIG. 2, the modem clock signal and the PCM clock signal each have a frequency of approximately 8000 Hz. However, the techniques described herein are applicable to other clock frequencies, as well as systems having more than two unsynchronized clocks.

The buffer 110 in the WCD 100 encounters overflow or underflow problems due to the multiple unsynchronized clock sources. In general, the difference in clock rates is not known in advance and it can vary over time. Therefore, buffer overflow/underflow problems are handled dynamically when sample slipping is detected.

The buffer 110 includes a receive (Rx) buffer 116 and a transmit (Tx) buffer 118. The Rx buffer 116 receives digital audio samples from the vocoder 106 and passes frames of these samples to the DAC 120. The Tx buffer 118 receives digital audio samples from the ADC 122 and passes frames of these samples to the vocoder 106. The Rx buffer 116 and Tx buffer 118 each temporarily store a frame of samples. In the example of FIG. 2, the Rx and Tx buffers 116, 118 output frames according to the modem clock signal from the modem clock 102. Since the PCM and modem clocks are not synchronized, the number of samples in each frame can vary, as discussed in further detail below in connection with FIG. 3.

The processor 112 is configured by firmware stored in the memory 114 to provide a digital filter 113 and an interpolator 115. The digital filter 113 and interpolator 115 perform the tasks of sample filtering and interpolation to reduce the effects of buffer sample slipping, as described in further detail below in connection with FIGS. 4-8.

The processor 112 is also configured by the firmware to determine whether a buffer underflow or buffer overflow condition exists in either the Rx buffer 116 or Tx buffer 118, based on the number of samples received into the respective buffer during a frame. Sample slipping can be detected by monitoring the number of samples being passed to or from the modem-clocked subsystem 103 during a processing frame. Typically, in a CDMA or W-CDMA system, the vocoder 106 processes 20 milliseconds of data during each frame. This means that the vocoder 106 operating at an 8 KHz sampling rate expects 160 samples of data during each processing frame. If this quota is not met, sample slipping occurs. Sample slipping can occur in both the Tx and Rx paths 105, 107. If the ADC 122 in the Tx path 105 does not provide the expected 160 samples of data to the vocoder 106, then sample slipping occurs in the Tx path 105. Similarly, if the DAC 108 in the Rx path 107 receives less than or more than 160 samples per processing frame, then sample slipping occurs in the Rx path 107.

If a buffer underflow exists, the processor 112 interpolates the samples to compute one or more additional samples and then stuffs the additional samples into the underflowing buffer. If a buffer overflow exists, the processor 112 filters the samples and then discards extra samples from the overflowing buffer.

Generally, the solution to sample slipping in the Tx path 105 can be categorized under two types: 1) sampling down when the PCM clock 104 is faster than the modem clock 102; and 2) sampling up when the PCM clock 104 is slower than the modem clock 102. For the Rx path 107, sampling up will be done if the PCM clock 104 is faster than the modem clock 102, and sampling down will be performed if the PCM clock 104 is slower than the modem clock 102.

When the PCM clock 104 is faster than the modem clock 102, extra samples in the overflowing Tx buffer 118 in the Tx path 105 are filtered and removed; and new samples are interpolated and added to the underflowing RX buffer 116 in the Rx path 107. For example, in the case of a CDMA or W-CDMA voice communication system, the samples are filtered and then an extra sample in the Tx path 105, the $161^{st}$ sample, is removed from the Tx buffer 118 and discarded.

When the PCM clock 104 is slower than the modem clock 102, new samples are interpolated and added to the underflowing Tx buffer 118 in the Tx path 105, and samples are filtered and extra samples are removed from the overflowing Rx buffer 116 in the Rx path 107. For example, in a CDMA or W-CDMA voice communication system, the missing sample in the Tx path 105 can be filled by repeating the $159^{th}$ sample in the place of the $160^{th}$ sample, and then averaging the $158^{th}$ and $160^{th}$ sample to compute a new interpolated value for the $159^{th}$ sample.

The components 102-126 of the WDC 100 may be implemented using any suitable combination of hardware and software components or modules. In some configurations, the processor 112, memory 114, buffer 110 and subsystems 103, 108 are included in a mobile station modem (MSM) capable of controlling overall operation of the WCD 100. In any case, processor 112 may be implemented as one or more microprocessors, digital signal processors (DSPs), application specific integrated circuits (ASICs), field programmable gate arrays (FPGAs), complex programmable logic devices (CPLDs), discrete logic, software, hardware, firmware or any combinations thereof. The buffer 110 may be included in the memory 114, or may also be implemented, at least in part, as a standalone memory. The modem and PCM clocks 102, 104 may each include any suitable clocking mechanism, such as an on-chip oscillator circuit, crystal oscillator or the like, or the clocks 102, 104 may derived from clock sources external to the WCD 100.

Figure 3:
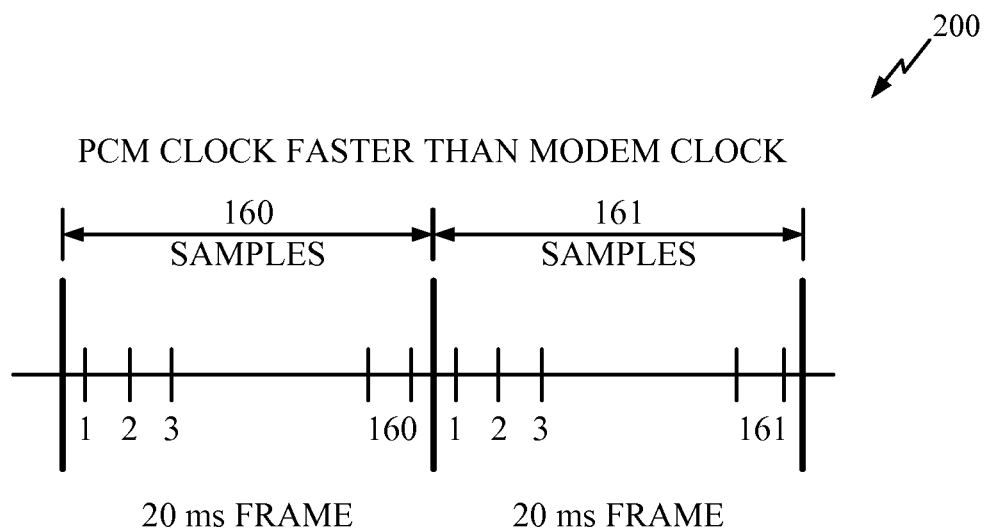
FIG. 3 illustrates sample slipping that can occur in the wireless communication device of FIG. 2.
Figure 3:
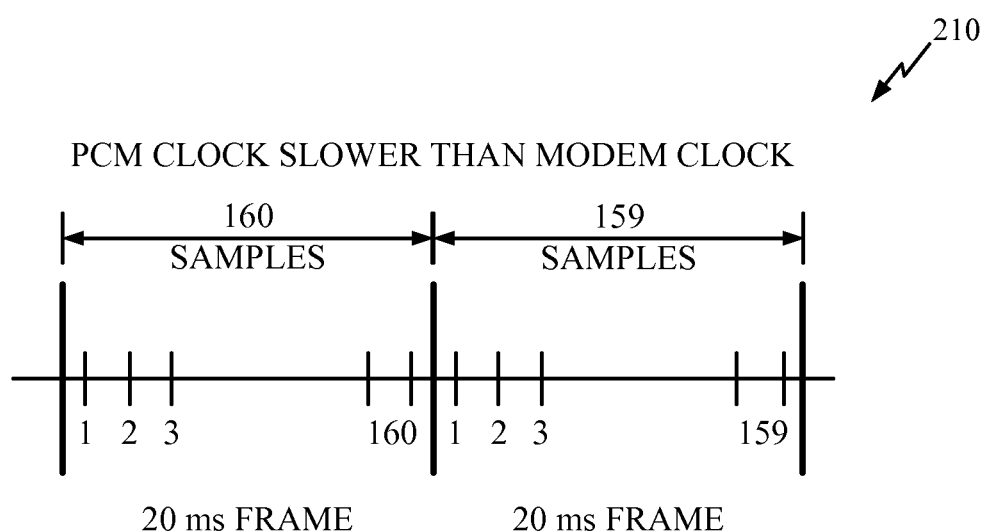

FIG. 3 conceptually illustrates sample slipping that may occur in the WCD 100 of FIG. 2. Timeline 200 illustrates a buffer overflow condition, and timeline 210 illustrates a buffer underflow condition, both conditions occurring in the Tx path 105. In some circumstances, the difference between the PCM and modem clock rates does not typically exceed 50 Hz. In a CDMA or W-CDMA system, if the difference between the two clocks is low, for example 1 Hz, then sample slipping occurs approximately only once in fifty frames. However, if the difference between the clocks is higher, for example 50 Hz, then sample slipping may occur in every frame. In situations where the frequency difference is 50 Hz or less, if the PCM clock 104 is faster than the modem clock 102, the ADC 122 delivers 160 or utmost 161 samples during a given processing frame. If the ADC 122 delivers 161 samples, the extra sample causes a buffer overflow in the Tx buffer 118. This condition is shown in FIG. 3 as timeline 200. With a faster PCM clock, sample slipping problem may occur in both the Tx and the Rx paths 105, 107: a sample buffer underflow may occur in the Rx buffer 116.

If the PCM clock 104 is slower than the modem clock 102, then the ADC 122 delivers 160 or at least 159 samples during a given processing frame. If the ADC 122 delivers only 159 samples, the missing sample causes a buffer underflow in the Tx buffer 118. This condition is shown in FIG. 3 as timeline 210. With a slower PCM clock, the sample slipping problem may occur in both the Tx and Rx paths 105, 107: a sample buffer overflow may occur in the Rx buffer 116.

Figure 4:
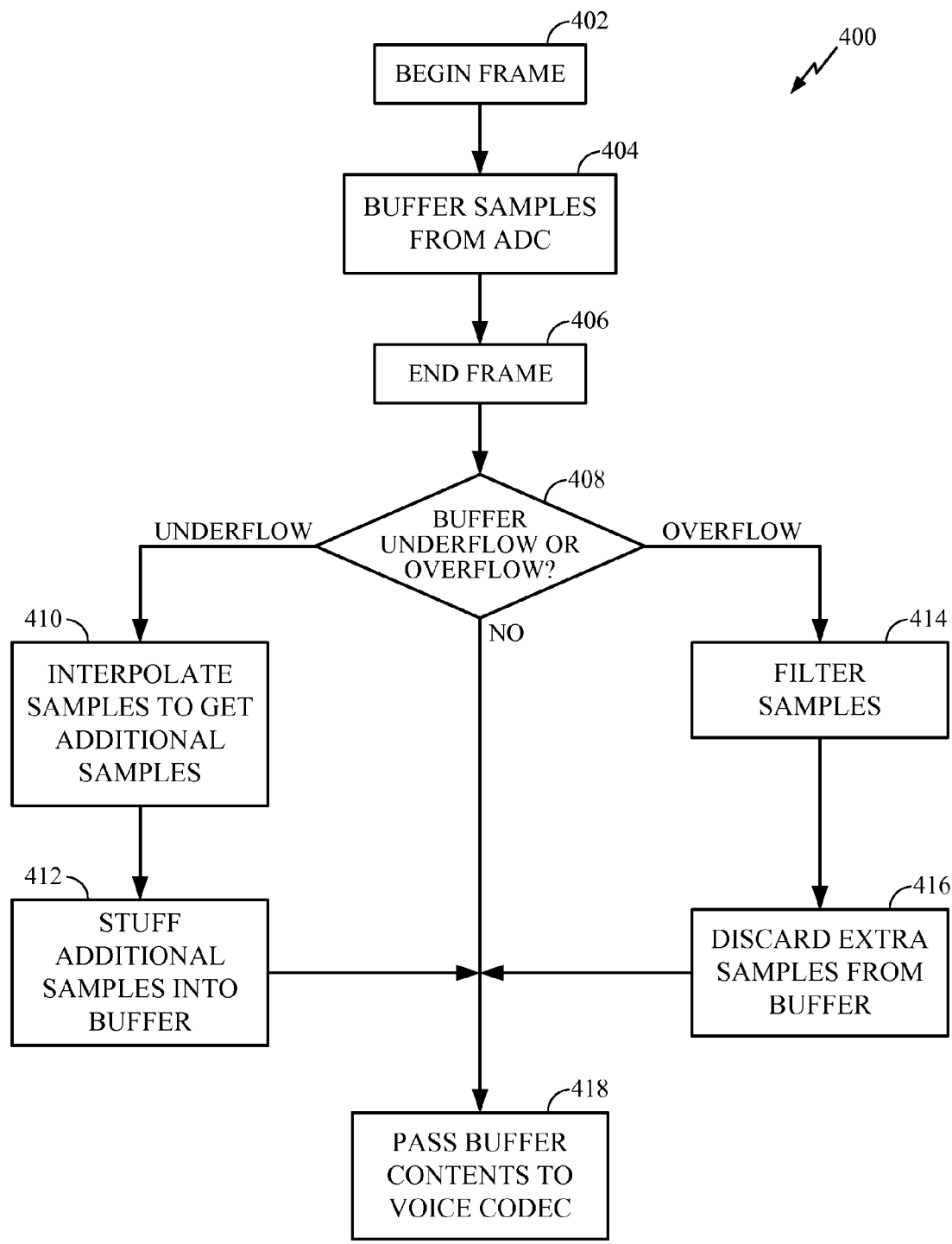
FIG. 4 is a flowchart illustrating a method of operating the wireless communication device shown in FIG. 2 to compensate for sample slipping.

FIG. 4 is a flowchart 400 illustrating a method of operating the WCD 100 to compensate for sample slipping that occurs in the Tx path 105. As explained previously, sample buffer overflow/underflow problems occur in both Tx and Rx paths 105, 107 and the sample slipping solution is implemented on both paths. Although the method of FIG. 4 is described in detail for only the Tx path, one of ordinary skill in the art will readily appreciate that the method is equally applicable to handling sample slipping in the Rx path of the WCD 100. The processing steps are essentially the same for either the Tx or Rx paths 105, 107.

In step 402, the processor 112 delimits the start of a new frame, according to the modem clock. Samples output from the ADC 122 are then stored in the Tx buffer 118 (step 404). After the frame period has expired, according to the modem clock (step 406), the processor 112 determines the number of samples currently in the Tx buffer 118. In a typical CDMA or W-CDMA system, the frame period is 20 milliseconds.

The processor 112 then compares that number to the expected number of samples per frame to determine whether a buffer underflow or a buffer overflow condition exists (step 408). In a typical CDMA or W-CDMA system, the expected number of samples per frame is 160. If the number of samples is less than expected, a buffer underflow condition exists. If the number is more than expected, a buffer overflow condition exists.

If a buffer underflow exists, the processor 112 interpolates the samples to compute one or more additional samples (step 410). The interpolation can be a zeroth-order, linear, quadratic, cubic or even higher order polynomial interpolation. In accordance with one configuration, the interpolation is a zeroth-order interpolation, which involves repeating one or more samples as additional samples. Using a zeroth-order interpolation, the samples can be filtered to smooth discontinuities, as described in further detail below in connection with FIGS. 7 and 8. Alternatively, the interpolation can be a higher-order interpolation applied to a subset of neighboring samples to compute the additional samples, where the interpolation is an nth-order polynomial interpolation, where $n \geq 1$.

After interpolating the samples, the processor 112 then stuffs the additional samples into the Tx buffer 118 (step 412).

If a buffer overflow exists, the processor 112 filters the samples (step 414) and discards the extra samples from the Tx buffer 118 (step 416). In the case the WCD 100 using CDMA or W-CDMA technology, the modem-clocked subsystem 103 expects 160 samples of data during every frame. If the PCM clock 104 is faster than the modem clock 102, then the Tx buffer 118 may occasionally contain 161 samples of data. Let the samples in the data buffer be represented by the vector $x(n), n=1, 2, \ldots, 161$. The goal is to generate 160 data samples from the available 161 samples while minimizing signal discontinuity caused by abruptly discarding of the $161^{st}$ sample. This can be achieved by linear filtering the data vector x(n) using a low-pass filter, prior to discarding the $161^{st}$ sample. By filtering using the $161^{st}$ sample, the filtering operation exploits the information carried by the extra sample before it is discarded by the processor 112.

In general, the low-pass filtered output y(n) can be expressed as follows:

$$x_{new}(n) = \sum_m h(m)x(n-m) \quad \text{(Eq. 1)}$$

$$n = 1, 2, \ldots, 161$$

The function h(m) is the impulse response of the low-pass filter, where m=1 to n. The value $x_{new}(n)$ represents the filtered samples.

The sample filtering may also be localized about a subset of samples neighboring a particular sample, as described in further detail below in connection with FIGS. 5 and 6.

In step 418, the contents of the Tx buffer 118 are passed to the vocoder 106 for further processing.

For handling sample slipping the Rx path 107 of the WCD 100 according to the above method, samples from the vocoder 106 are received into the Rx buffer 116; processed according to steps 402-416, with the Rx buffer 116 substituting for the Tx buffer 118; and then passed to the DAC 120, instead of the vocoder 106.

Figure 5:
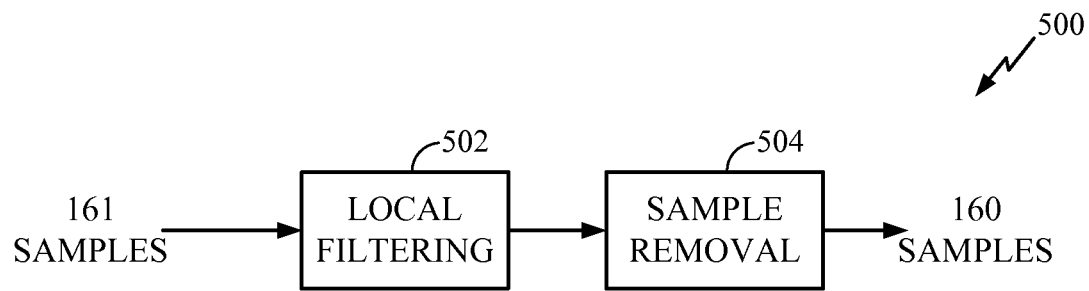
FIG. 5 is a process diagram showing specific steps for processing a buffer overflow condition.

FIG. 5 is a process diagram 500 showing specific steps for processing a buffer overflow condition by localized filtering of samples (block 502) and subsequent removal of one or more extra samples (block 504). With local filtering (block 502), a modified version of low-pass filtering is used, where the low-pass filter is implemented only in a localized region close to a particular sample, for example, the last sample or $160^{th}$ sample. Performing localized low-pass filtering (block 502) can smooth out the data near discontinuity while not disturbing majority of samples in the buffer 110. For example, the low-pass filter can be performed only on samples 158 to 160 using h(m)=[0.25,0.25,0.25,0.25], or alternatively, on only samples 160 and 161 using h(m)=[0.5,0.5]. After the local filtering is performed, the extra sample(s) are removed from the buffer (block 504).

Figure 6:
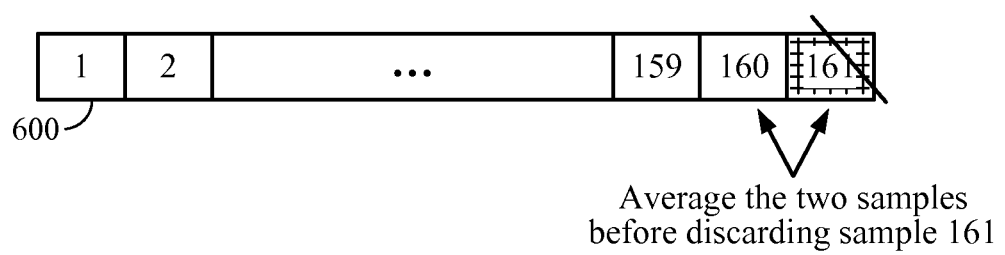
FIG. 6 conceptually illustrates an example of processing an overflowing buffer.

FIG. 6 conceptually illustrates the process of FIG. 5 as applied to an overflowing buffer 600. The localized low-pass filtering is performed only on the $160^{th}$ sample. The filtering operation replaces the $160^{th}$ sample with the average of $160^{th}$ and $161^{st}$ samples, according to Equation 2; and the remaining samples are unchanged, as shown by Equation 2a:

$$x_{new}(160)=0.5*(x(160)+x(161)) \quad \text{(Eq. 2)}$$

$$x_{new}(n)=x(n), \text{ for n=1}, \ldots, 159 \quad \text{(Eq. 2a)}$$

In this example, the filter performs low-pass filtering in the localized region ($160^{th}$ sample) and it helps in reducing the discontinuity caused by removal of the extra sample. The filtering operation also exploits the information carried by the extra sample before it is discarded by the processor 112. Furthermore, the localized filtering affects only a single sample and preserves the rest of the samples in the buffer intact, thus not adding extra artifacts in the processed signal.

Figure 7:
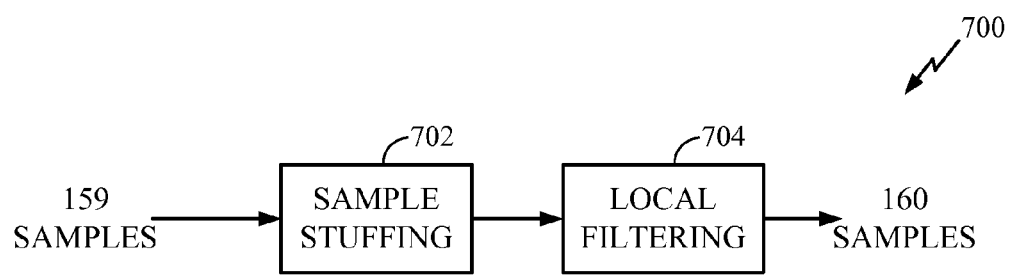
FIG. 7 is a process diagram showing specific steps for processing a buffer underflow condition.

FIG. 7 is a process diagram 700 showing a preferred method of interpolating samples when a buffer underflow condition occurs. Using this method, one or more repeated samples are stuffed into the buffer 110 (block 702), and then local filtering is performed on the repeated samples (block 704). Using the Tx path 105 as an example, when the PCM clock 104 is slower than the modem clock 102, the Tx buffer 118 may occasionally contain only 159 samples of data during a processing frame. Since the vocoder 106 expects 160 samples of data during the frame, additional samples are derived from the 159 samples received. Let the samples in the data buffer be represented by the vector x(n), n=1, 2, ..., 159. In this case, the goal is to generate 160 data samples from 159 available samples. This is done by interpolating the $160^{th}$ sample from the available samples. Using zeroth-order interpolation, the $159^{th}$ sample is simply repeated as the $160^{th}$ sample and stuffed into the buffer (block 702). Since the zeroth-order interpolation may cause discontinuities in the data samples, linear filtering is used to smooth the resulting interpolated samples (block 704). In this method, localized linear filtering is performed after stuffing an extra sample, x(160), into the data buffer 110.

Figure 8:
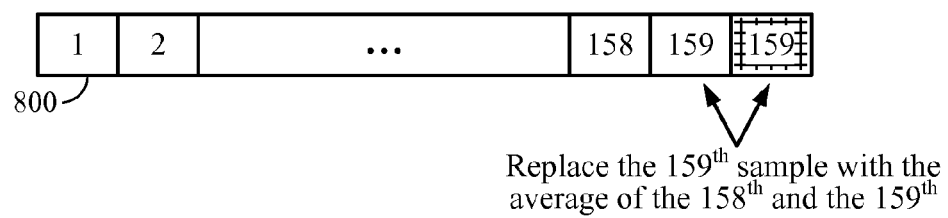
FIG. 8 conceptually illustrates an example of processing an underflowing buffer.

FIG. 8 conceptually illustrates an example of processing an underflowing buffer 800 according to the method depicted in FIG. 7. The sample stuffing and the filtering operation can be described according to Equations 3-5, respectively, as follows:

$$x_{new}(160)=x(159) \quad \text{(Eq. 3)}$$

$$x_{new}(159)=0.5*(x(158)+x(159)) \quad \text{(Eq. 4)}$$

$$x_{new}(n)=x(n), \text{ for n=1}, \ldots, 158 \quad \text{(Eq. 5)}$$

The filtering operation, represented by above Equation 4, performs an elementary form of low-pass filtering in the localized region ($159^{th}$ sample) and it helps in reducing the discontinuity caused by the addition of extra sample to the sample buffer. The filtering operation can be implemented easily using a single addition and a single right shift and it does not add significant computational burden to the complexity of the digital system.

The interpolation can alternatively be performed using a higher-order interpolation, such as a linear, quadratic, cubic, or even higher-order interpolation.

Using linear interpolation, the $160^{th}$ sample is formed as a linear combination of two neighboring samples. In this case, a straight line is fit using two neighboring samples and the $160^{th}$ sample is computed as the data point that lies on this line. Linear interpolation of the $160^{th}$ sample can be expressed according to Equation 6, as follows.

$$x(160) = \sum_k a_k x(160-k) \quad \text{(Eq. 6)}$$

$$k = 1, 2 \text{ or } k = 1, -1 \text{ etc.}$$

The interpolation coefficients, $a_k$, are determined by fitting a straight line through neighboring samples. The interpolated output may also be further smoothed by performing localized low-pass filtering of only a few samples neighboring the $160^{th}$ sample. The localized low-pass filtering can be performed as described above in connection with Equations 1 and 2.

Using polynomial interpolation, the $160^{th}$ sample value is computed by fitting a polynomial on the neighboring samples. With quadratic interpolation, three neighboring samples are used to fit a second order curve and the $160^{th}$ sample is computed as the data point that lies on this curve. With cubic interpolation, four neighboring samples are used to fit a third order curve and the $160^{th}$ sample is computed as the data point that lies on this curve. Using polynomial interpolations, the interpolated sample(s) may also be further smoothed by performing localized low-pass filtering only on a few samples neighboring 160$^{th}$ sample.

Several embodiments have been described. However, various modifications to these embodiments are possible, and the principles presented herein may be applied to other embodiments as well. Methods and/or components as described herein may be implemented in hardware, software, firmware or any suitable combination of the foregoing. The various components and/or method steps may be implemented in a software program having sets of instructions (e.g., code segments) executable by one or more digital circuits, such as microprocessors, DSPs, embedded controllers, or intellectual property (IP) cores. In one example, one or more such steps are arranged for execution within a mobile station modem chip or chipset that is configured to control operations of various components of a personal communications device such as a cellular telephone.

Other embodiments and modifications will occur readily to those of ordinary skill in the art in view of these teachings. Therefore, the following claims are intended to cover all such embodiments and modifications when viewed in conjunction with the above specification and accompanying drawings.

What is claimed is:

1. A method of resolving buffer underflow/overflow, comprising:
    receiving a plurality of samples based on a first clock source;
    determining whether a buffer underflow or buffer overflow exists by comparing the number of samples received to an expected number of samples, wherein the expected number of samples is based on a second clock source;
    if a buffer underflow exists, interpolating only a subset of the received samples that is fewer than the number of samples received to compute one or more additional samples; and
    if a buffer overflow exists, performing localized filtering of a subset of the samples by weighting only the subset of the received samples and summing the weighted samples to produce at least one filtered sample, and discarding one or more extra samples.

2. The method of claim 1, wherein interpolating includes:
    stuffing one or more of the samples as the additional samples; and
    filtering at least one of the samples and the additional samples.

3. The method of claim 2, wherein filtering at least one of the samples and the additional samples includes localized filtering of a predetermined subset of the samples including the additional samples.

4. The method of claim 1, wherein interpolating includes performing an interpolation of a predetermined subset of neighboring samples to determine the additional samples, wherein the interpolation is an nth-order polynomial interpolation, where n≥1.

5. The method of claim 4, further comprising localized filtering of the predetermined subset of the samples.

6. The method of claim 1, further comprising:
    filtering the additional samples.

7. The method of claim 6, wherein filtering the additional samples includes localized filtering of a predetermined subset of the samples including the additional samples.

8. The method of claim 1, wherein filtering includes low-pass filtering.

9. The method of claim 1, wherein the subset of the samples that is subject to localized filtering is located about a predetermined received sample.

10. A system for resolving buffer underflow/overflow, comprising:
    means for receiving a plurality of samples based on a first clock source;
    means for determining whether a buffer underflow or buffer overflow exists by comparing the number of samples received to an expected number of samples, wherein the expected number of samples is based on a second clock source;
    means for interpolating only a subset of the received samples that is fewer than the number of samples received to compute one or more additional samples, if a buffer underflow exists;
    means for localized filtering of a subset of the received samples by weighting only the subset of the received samples and summing the weighted samples to produce at least one filtered sample, if a buffer overflow exists; and
    means for discarding one or more extra samples from the samples, if a buffer overflow exists.

11. The system of claim 10, wherein the interpolating means includes:
    means for stuffing one or more of the samples as the additional samples; and
    means for filtering at least one of the samples and the additional samples.

12. The system of claim 11, wherein the means for filtering at least one of the samples and the additional samples includes means for localized filtering of a predetermined subset of the samples including the additional samples.

13. The system of claim 10, wherein the interpolating means includes:
    means for performing an interpolation of a predetermined subset of neighboring samples to determine the additional samples, wherein the interpolation is an nth-order polynomial interpolation, where n≥1.

14. The system of claim 13, further comprising means for localized filtering of the predetermined subset of the samples.

15. The system of claim 10, further comprising:
    means for filtering the additional samples.

16. The system of claim 15, wherein the means for filtering the additional samples includes means for localized filtering of a predetermined subset of the samples including the additional samples.

17. The system of claim 10, wherein the filtering means includes a low-pass filter.

18. The system of claim 10, wherein the subset of the samples subject to localized filtering is located about a predetermined received sample.

19. A non-transitory computer-readable medium storing a software program comprising:
    a first code segment for buffering a plurality of digital samples corresponding to a predetermined frame based on a first clock source;
    a second code segment for determining whether a buffer underflow or buffer overflow exists by comparing the number of digital samples received to an expected number of samples, wherein the expected number of samples is based on a second clock source;
    a third code segment for interpolating only a subset of the received digital samples that is fewer than the number of samples received to compute one or more additional digital samples, if a buffer underflow exists;
    a fourth code segment for localized filtering of a subset of the buffered samples by weighting only the subset of the received buffered samples and summing the weighted samples to produce at least one filtered sample, if a buffer overflow exists; and a fifth code segment for discarding one or more extra digital samples from the digital samples, if a buffer overflow exists.

20. The computer-readable medium of claim 19, wherein the third code segment includes:
   a code segment for stuffing one or more of the samples as the additional samples; and
   a code segment for filtering at least one of the samples and the additional samples.

21. The computer-readable medium of claim 20, further comprising a code segment for localized filtering of a predetermined subset of the samples including the additional samples.

22. The computer-readable medium of claim 19, wherein the third code segment includes:
   a code segment for performing an interpolation of a predetermined subset of neighboring samples to determine the additional samples, wherein the interpolation is an nth-order polynomial interpolation, where $n \geq 1$.

23. The computer-readable medium of claim 22, further comprising a code segment for localized filtering of the predetermined subset of the samples.

24. The computer-readable medium of claim 19, wherein the subset of the samples subject to localized filtering is located about a predetermined buffered sample.

25. An apparatus, comprising:
   a plurality of clock sources, unsynchronized with one another;
   a first subsystem configured to process digital samples according to a first clock signal from a first one of the clock sources;
   a second subsystem configured to process digital samples according to a second clock signal from a second one of the clock sources;
   a buffer configured to receive a plurality of digital samples output from the first subsystem based on the first clock signal; and
   a processor configured to determine whether a buffer underflow or buffer overflow exists by comparing the number of digital samples received into the buffer during a predetermined frame to an expected number of samples, wherein the expected number of samples is based on the second clock signal,
   if a buffer underflow exists, the processor configured to interpolate only a subset of the buffered digital samples that is fewer than the number of samples received to compute one or more additional samples and stuff the additional samples into the buffer,
   if a buffer overflow exists, the processor configured to: perform localized filtering of a subset of the buffered samples by weight only the subset of buffered samples and sum the weighted samples to produce at least one filtered sample, and then discard one or more extra samples from the buffer.

26. The apparatus of claim 25, wherein the apparatus is included in a wireless mobile device.

27. The apparatus of claim 25, wherein the first subsystem includes a voice codec and the second subsystem includes a digital-to-analog converter (DAC).

28. The apparatus of claim 25, wherein the first subsystem includes an analog-to-digital converter (ADC) and the second subsystem includes a voice codec.

29. A device for resolving buffer underflow/overflow, comprising:
   a buffer configured to store a plurality of samples based on a first clock source;
   a first circuit configured to determine whether a buffer underflow or buffer overflow exists by comparing the number of samples received into the buffer to an expected number of samples, wherein the expected number of samples is based on a second clock source;
   a second circuit configured to interpolate a subset of the received samples that is fewer than the number of samples received to compute one or more additional samples and stuff the additional samples into the buffer, if a buffer underflow exists; and
   a third circuit configured to perform localized filtering on a subset of the buffered samples by weighting only the subset of the buffered samples and sum the weighted samples to produce at least one filtered sample, and to discard one or more extra samples from the buffer, if a buffer overflow exists.

30. The device of claim 29, wherein the second circuit includes:
   a circuit configured to stuff one or more of the samples as the additional samples; and
   a circuit configured to filter at least one of the samples and the additional samples.

31. The device of claim 30, wherein further comprising a circuit configured to perform localized filtering of a predetermined subset of the samples including the additional samples.

32. The device of claim 29, wherein the second circuit includes:
   a circuit configured to perform an interpolation of a predetermined subset of neighboring samples to determine the additional samples, wherein the interpolation is an nth-order polynomial interpolation, where $n \geq 1$.

33. The device of claim 32, further comprising a circuit configured to perform localized filtering of the predetermined subset of the samples.

34. The device of claim 29, wherein the subset of the samples subject to localized filtering is located about a predetermined buffered sample.

35. The device of claim 29, wherein the third circuit includes a low-pass filter circuit.

* * * * *